United States Patent
Carru et al.

(10) Patent No.: US 11,797,497 B2
(45) Date of Patent: Oct. 24, 2023

(54) BUNDLE CREATION AND DISTRIBUTION

(71) Applicant: Snowflake Inc., Bozeman, MT (US)

(72) Inventors: Damien Carru, New York, NY (US); Benoit Dageville, San Mateo, CA (US); Subramanian Muralidhar, Mercer Island, WA (US); Eric Robinson, Sammamish, WA (US); Sahaj Saini, Seattle, WA (US); David Schultz, Piedmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/068,998

(22) Filed: Dec. 20, 2022

(65) Prior Publication Data

US 2023/0273905 A1 Aug. 31, 2023

Related U.S. Application Data

(60) Provisional application No. 63/268,494, filed on Feb. 25, 2022.

(51) Int. Cl.
*G06F 16/21* (2019.01)
*G06F 21/62* (2013.01)
*G06F 16/28* (2019.01)

(52) U.S. Cl.
CPC .......... *G06F 16/212* (2019.01); *G06F 16/285* (2019.01); *G06F 21/6245* (2013.01)

(58) Field of Classification Search
CPC ... G06F 16/212; G06F 16/285; G06F 21/6245
See application file for complete search history.

(56) References Cited

U.S. PATENT DOCUMENTS

| | | | |
|---|---|---|---|
| 11,250,217 B1* | 2/2022 | Mohajer | H04L 67/10 |
| 11,429,353 B1* | 8/2022 | Liguori | G06F 8/311 |
| 2011/0196883 A1* | 8/2011 | Brooks | G06F 16/27 |
| | | | 707/812 |
| 2020/0159514 A1* | 5/2020 | Brooks | G06F 16/214 |
| 2022/0272163 A1* | 8/2022 | Schuller | H04L 67/34 |
| 2022/0405068 A1* | 12/2022 | Brown | G06F 21/10 |

FOREIGN PATENT DOCUMENTS

EP 3745265 B1 * 4/2023 ........... G06F 15/177

OTHER PUBLICATIONS

NPL Search Terms (Year: 2023).*
Yesin, Vitalii I., et al. "Ensuring database security with the universal basis of relations." Computer Information Systems and Industrial Management: 17th International Conference, CISIM 2018, Olomouc, Czech Republic, Sep. 27-29, 2018, Proceedings 17. Springer International Publishing, 2018. (Year: 2018).*

* cited by examiner

*Primary Examiner* — Syed A Zaidi
(74) *Attorney, Agent, or Firm* — Schwegman Lundberg & Woessner, P.A.

(57) ABSTRACT

Techniques for creating, sharing, and using bundles (also referred to as packages) in a multi-tenant database are described herein. A bundle is a schema object with associated hidden schemas. A bundle can be created by a provider user and can be shared with a plurality of consumer users. The bundle can be used to enable code sharing and distribution without losing control while maintaining security protocols.

21 Claims, 6 Drawing Sheets

BUNDLE CREATION AND DISTRIBUTION

CROSS-REFERENCE TO RELATED APPLICATION

This application claims the benefit of priority to U.S. Provisional Patent Application Ser. No. 63/268,494 filed Feb. 25, 2022, the contents of which are incorporated herein by reference in its entirety.

TECHNICAL FIELD

The present disclosure generally relates to database objects, and in particular, packaging of different objects for distribution.

BACKGROUND

As the world becomes more data driven, database systems and other data systems are storing more and more data. Developers therefore are developing applications to access and use the data in more efficient and useful manners. However, developer efforts can be hindered by a number of factors. For example, database systems typically lack modularity. Because of this lack of modularity, developers cannot define modules or groups of primitive objects as schema objects that can be deployed and upgraded atomically.

Moreover, database systems can hamper code sharing and distribution. For example, one developer may send a code module to another user, who may have to essentially copy and paste the code to use it. Typically, there is not an easy way to share code modules without relinquishing control of the code.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques for creating, sharing, and using bundles (also referred to as packages) in a multi-tenant database are described herein. Bundles can address the challenges of modularity, encapsulation, code sharing, and distribution described above. A bundle is a schema object with associated hidden schemas. A bundle can be created by a provider user and can be shared with a plurality of consumer users. The bundle can be used to enable code sharing and distribution without losing control while maintaining security protocols.

Figure 1:
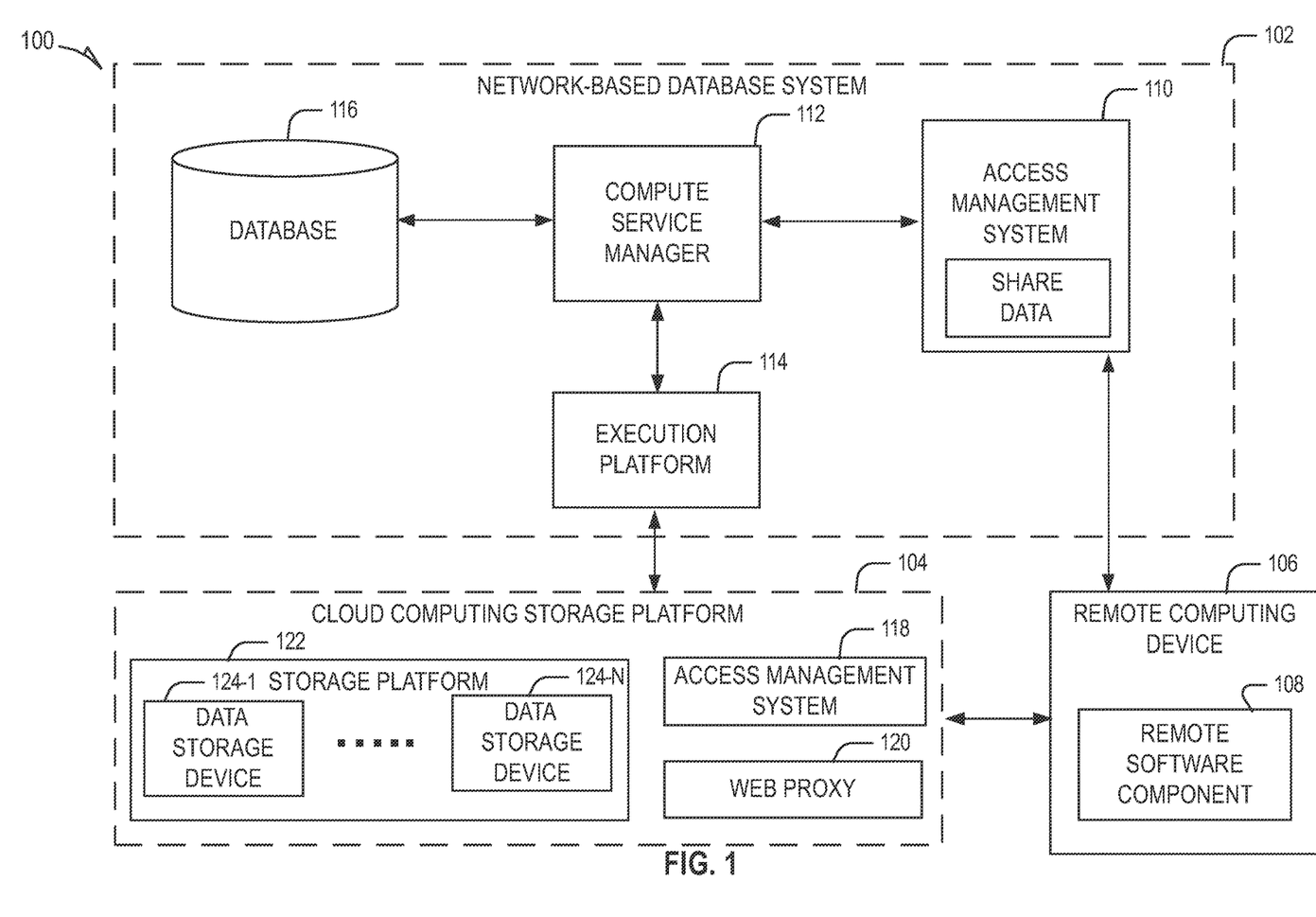
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data system 102, a cloud computing storage platform 104 (e.g., a storage platform, an AWS® service, Microsoft Azure®, or Google Cloud Services®), and a remote computing device 106. The network-based data warehouse system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views.

The network-based data warehouse system 102 comprises an access management system 110, a compute service manager 112, an execution platform 114, and a database 116. The access management system 110 enables administrative users to manage access to resources and services provided by the network-based data system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data system 102, as discussed in further detail below.

The compute service manager 112 coordinates and manages operations of the network-based data system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data system 102 and the access management system 118 of the cloud computing storage platform 104 can communicate and share information so as to enable access and management of resources and services shared by users of both the network-based data system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data system 102 based on the changing data storage/retrieval needs as well as the changing needs of the users and systems accessing the shared data processing platform 100. The support of dynamic changes allows network-based data system 102 to scale quickly in response to changing demands on the systems and components within network-based data system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data system 102 is dynamic and supports regular changes to meet the current data processing needs.

During typical operation, the network-based data system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
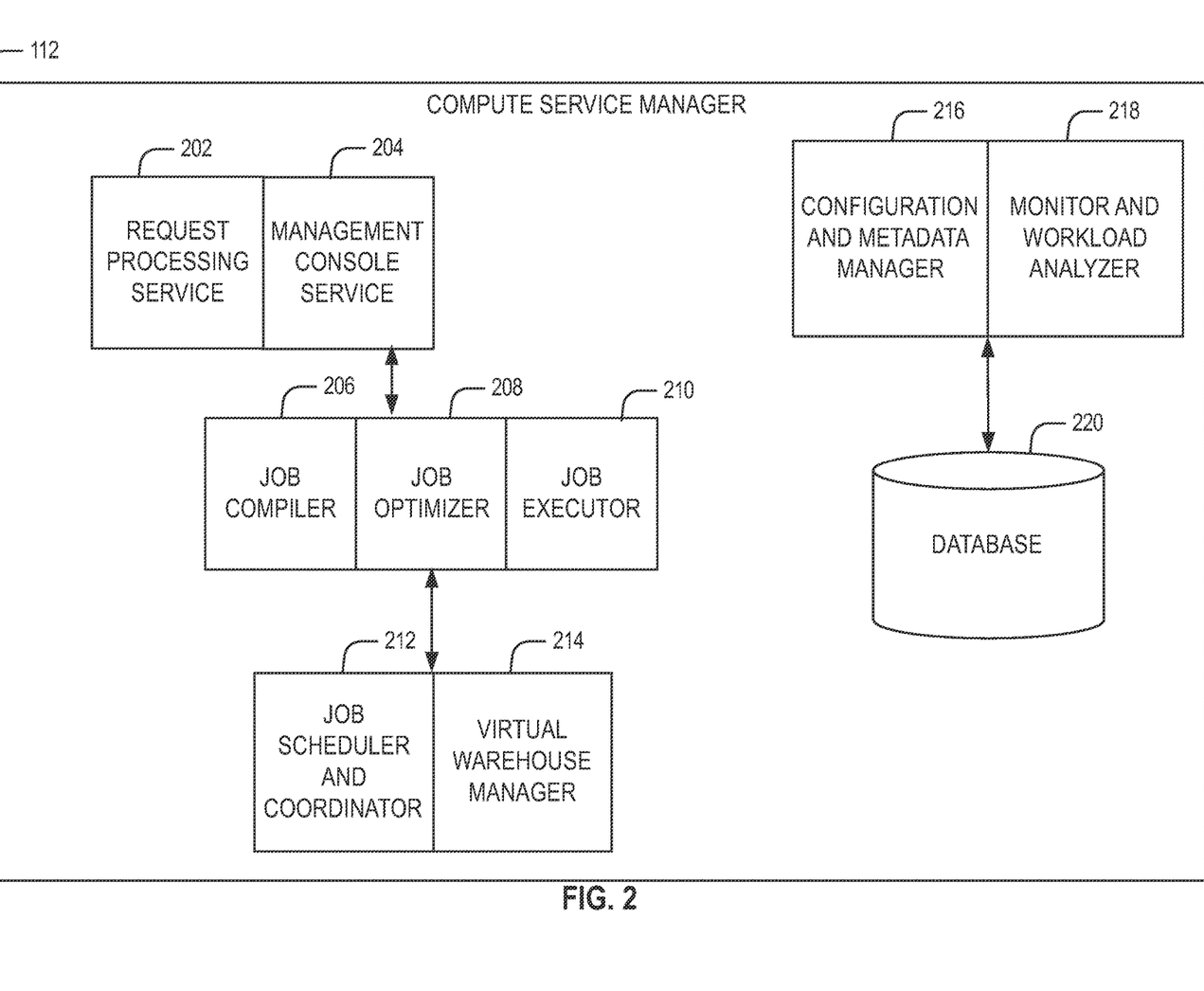
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data system 102. For example, data storage device 220 may represent caches in execution platform 114, storage devices in cloud computing storage platform 104, or any other storage device.

Figure 3:
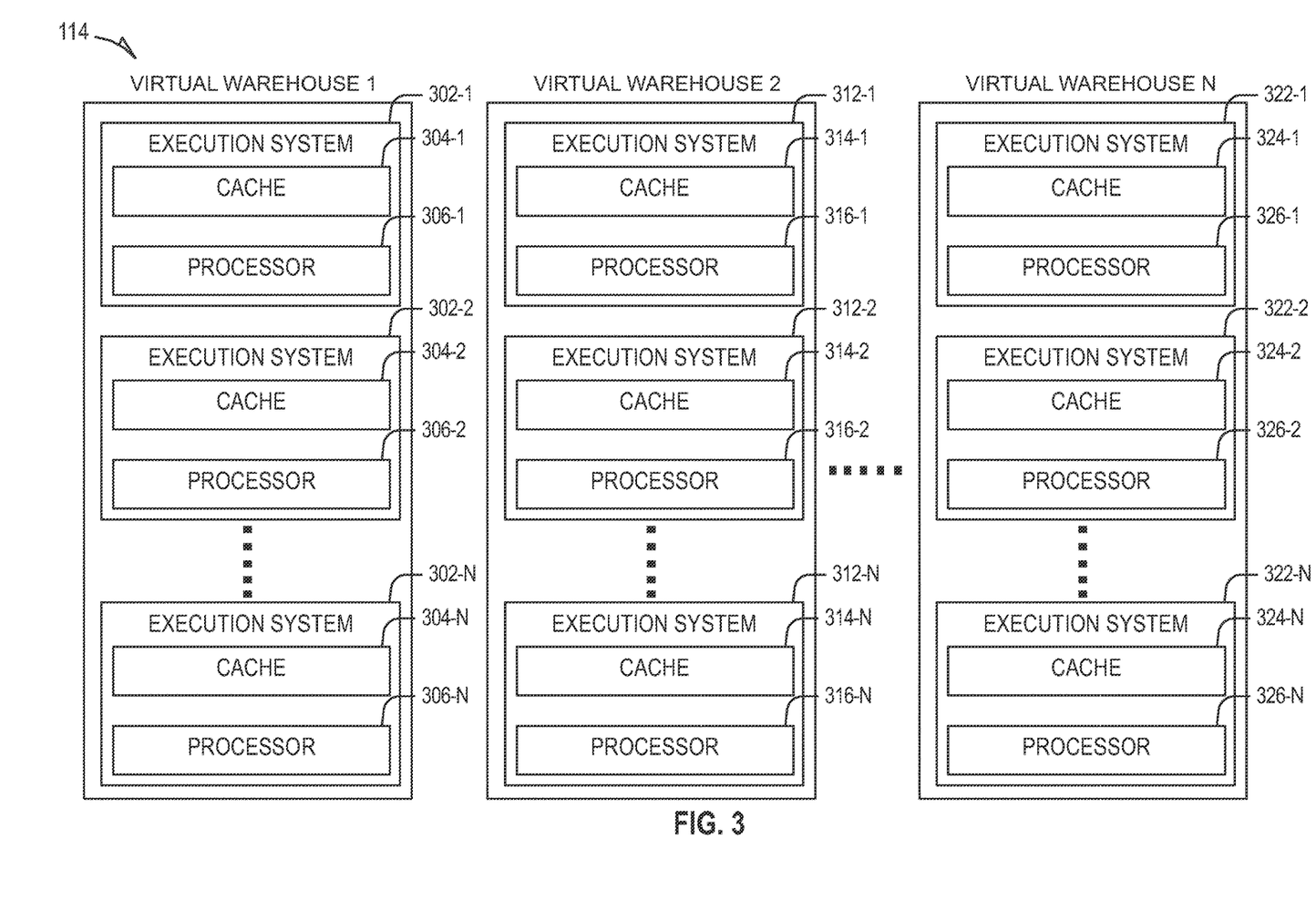
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Next, techniques for creating, sharing, and using bundles (also referred to as packages) will be described. Bundles may address the challenges of modularity, encapsulation, code sharing, and distribution described above. A bundle is a schema object with associated hidden schemas, as described in further detail below. A bundle can be created by a provider user and can be shared with a plurality of consumer users.

Bundles can be used for code modularity and encapsulation. Bundles can be implemented as code-only bundles or as code-and-state bundles. Code-only bundles can include packages of code modules such as stored procedures and/or functions. Code-only bundles can be used for packages of geospatial functions, global data sharing stored procedures, etc.

Code-and-state bundles can be used for more advanced functionality such as anonymization, machine learning (ML) models, alerts, budgets. Code-and-state bundles can be referred to as factory (also referred to as class) and instance bundles, where factory refers to a place to share code and instance refers to non-code objects such as tables, stages, etc. For example, a code-and-state bundle can be used to create a ML model to predict rent in a particular city based on data stored in a database system, as described above. The ML model can include a procedure that trains using stored data, and then the ML model can be used to generate a predicted rent output based on a set of inputs. Here, the procedure would be classified as the factory and the trained model would be classified as the state stored in an instance, which can be represented by a table, stage, file, etc. As described in further detail below, the bundles can provide ease of management, versioning, and name spacing.

Figure 4:
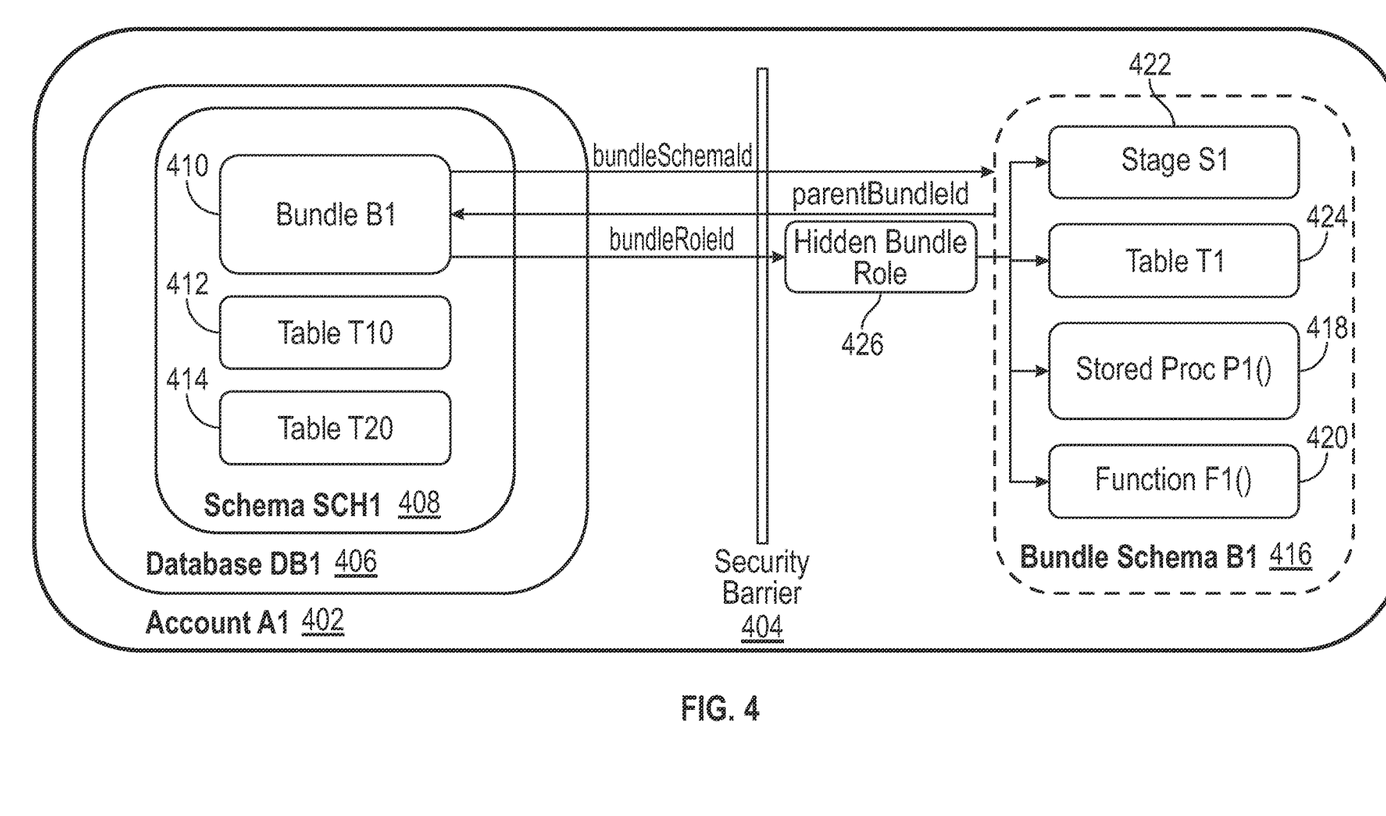
FIG. 4 illustrates a high-level block diagram of a data system with a bundle, according to some example embodiments.

FIG. 4 illustrates a high-level block diagram of a data system with a bundle, according to some example embodiments. The data system shows data objects belonging in Account A1 402 with a security barrier 404. Account A1 402 may be owned by a provider account. The left side of the security barrier shows objects that are directly accessible by an end user, such as a consumer. The objects on the left side are organized in a parent-child hierarchical structure. For example, the parent account A1 402 includes child database DB1 406. Then database DB1 406 includes schema SCH1 408. And schema SCH1 408 includes child bundle B1 410, table T10 412, and table T20 414. Each object on the left side of the security barrier 404 can be directly accessible by the end user. For the end user, bundle B1 410 appears as an interface. Bundle B1 410 includes associated hidden bundle schema B1 416 that are illustrated on the right side of the security barrier 404, referenced by bundleSchemaID.

Bundle Schema B1 416 here includes code, such as stored procedure P10 418 and function F1()420, and also includes states, such as stage S1 422 and Table T1 424. The bundle schema B1 416 is nested underneath the bundle B1 410 object itself (e.g., parentBundleID). The bundle schema B1 416 is provided outside of the parent-child hierarchy of objects that the user can interact directly as compared to objects on the other side of the security barrier 404. Hence, the consumer end user cannot directly name or reference the underlying objects in the bundle schema B1 416 that are not exposed.

The security barrier 404 provides a two-way protection. The security barrier 404 prevents consumer end users from directly accessing non-exposed objects in the bundle schema B1 416, while also preventing objects inside the bundle schema B1 416 from accessing objects outside the bundle schema B1 416. For example, while function F1()420 can access table T1 424 because both are inside bundle schema B1 416, function F1()420 may not be able to access table T20 414, which resides outside the bundle schema B1 416. Hence, the bundle schema B1 416 provides a self-contained schema that is only accessible by a consumer via the interface and cannot access other objects outside the bundle schema. For example, a consumer may not be able to directly reference the bundle schema or objects within a bundle schema using a dot (.) notation. Instead, the bundle schema objects can be referenced using the bundle name and a bang (!) notation, indicating its protection.

To provide this level of protection, processes are separated when interacting with the bundle schema using a hidden bundle role 426 (e.g., using bundleRoleID). The hidden bundle role 426 is not viewable or directly accessible by consumer end users. The hidden bundle role 426 is nested underneath the bundle object and effectively owns the objects inside the bundle schema B1 416. The hidden bundle role 426 is not directly accessible by consumer end users, but it is used to execute exposed functionality of the bundle B1 410. For example, consider that the provider has exposed some functionality of stored procedure P10 418 and/or function F1() 420 to be accessible by consumers. When a consumer end user goes to invoke the exposed functionality of P1()418 and/or function F1()420, execution is performed on the right side of the security barrier 404 and the context is switched to the hidden bundle role 426. For example, when the invocation by the consumer is received and it is determined that the invocation is allowed based on the end user package role (e.g., reader, writer, etc., which is different type of role than the hidden bundle role 426 and described in further detail below), execution of the invocation is performed in the context of the hidden bundle role 426 inside the bundle schema B1 416. The results of the execution are then delivered to consumer end user, who is unaware of the switching of contexts to execute the exposed functionality of the bundle.

Figure 5:
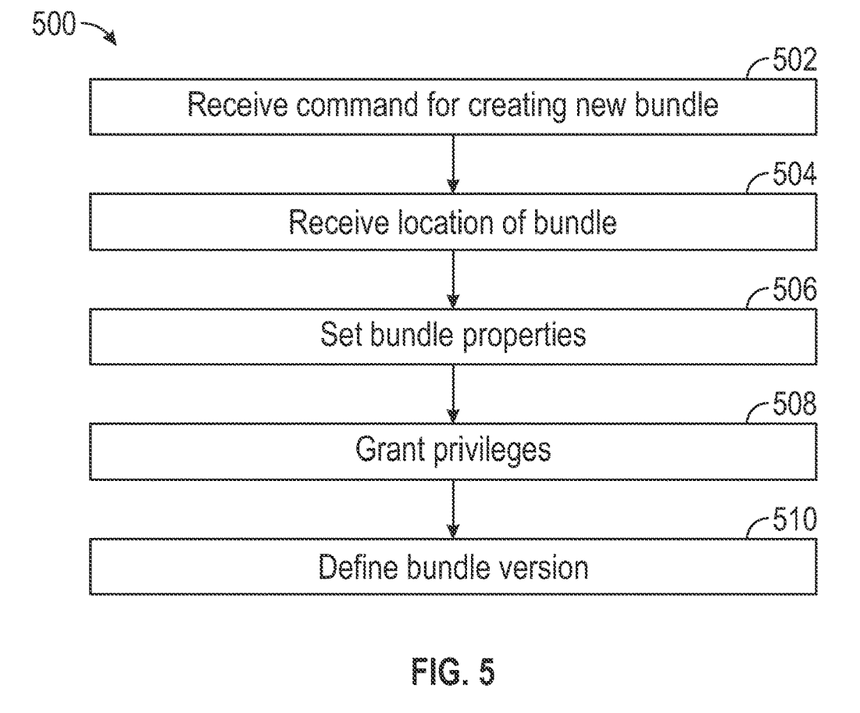
FIG. 5 illustrates a flow diagram for a method for creating a bundle or package, according to some example embodiments.

FIG. 5 illustrates a flow diagram for a method 500 for creating a bundle or package, according to some example embodiments. At operation 502, a command may be received for creating a new bundle or package. A bundle or package can be created by a provider user. For example, the provider may use a SQL command, such as "CREATE PACKAGE" to start the creation of a package, which is a new schema object.

At operation 504, designation of the bundle's location may be received. For example, the provider may designate in which database and schema the bundle will reside.

At operation 506, package/bundle properties may be set. The package/bundle properties may include name, package roles, comments, and tags. Package role (also referred to as an end user role) is different from the hidden bundle role (e.g., hidden bundle role 426) discussed above. Package roles define what role the consumer end user can have to access the exposed portions of the bundle/package. Package roles enable fine-grained permission granting of package contents to the external world (i.e., consumers).

At operation 508, privileges may be granted. The provider can grant privileges on functions to procedures to package roles in the version body, as described below. Consumers can grant package roles to appropriate roles in their account. In some embodiments, package roles are defined and specified at the package level, not version level. Package roles can be added or removed, for example using an alter command. Package roles can include reader, writer, administrator, etc. A comment section can be included and provide a description of the package and tag names may be added.

At operation 510, a package/bundle version may be defined. For example, an "alter" command may be used to add package version. The package version properties may include a name, description (comment), and body. Versions can be added, modified, and dropped. The version name/identifier (e.g., "0.0.0") may be a type string and may include a sequence, such as <major>.<minor>.<patch>. Each sequence number is a non-negative integer. Hence, providers can convey the significance of changes to consumers between releases. For example, <major> is changed for most significant changes, and changes to <minor> and <patch> represent changes of decreasing significance. Providers can release versions in increasing order and use ordering-based utility functions. Consumers can thus get consistent semantics across providers in the marketplace.

Moreover, the body of the version defines what objects are included in the package. In an example, a package can have a function named "get_status" and returns a string "varchar." The body can also includes a provision to grant access to the function to package role "reader." Thus, a consumer acting in a reader role would have access to execute the function "get_status" in this package.

The alter command may also be used to select version for consumers ("SET VERSION_SELECTOR"). Version selector can be a SQL expression that can evaluate consumer context and determines appropriate package version. Different versions may be selected for different consumers by the provider, as described in further detail below.

By using packages/bundles as described herein, the package/bundle can be shared with consumers while the provider retains control of the objects and code in the bundle. A bundle can be shared by granting privileges to consumers (e.g., package roles). Package roles may be granted to roles in the provider account. Package roles may be granted to other consumers to share and to DB roles (which are granted to share).

Versioning bundles provides more control to the provider. Alter commands can be used to set versions. In a first alter command, an "ADMIN" role can be added to the package roles. In a second alter command, a new version of the package can be added, e.g., version 1.0.0. The new version includes a body defining the new package version objects and defines privilege grants to different package roles of reader and admin. Each new version of bundle creates a new nested schema. This allows sharing of different versions with different consumers, such as rollout by region.

Version selection can be used to designate which version a particular consumer is designated to use. The provider can control which versions are shared with different consumers. While roles can be defined at the package-level, privilege grants to specific functions can be defined at the version-level. Thus, when a new version is rolled out by a provider, consumers do not have to change their package role designations. For example, a consumer user can grant different people in their account the package role of reader. Then, depending on which version the consumer is designated, the readers will have access to possibly different functionality.

For example, if the consumer is designated version 1, which includes only functionality A granted to readers, then the reader roles will have access to only functionality A. If version 2 adds functionality B granted to readers and if the consumer is designated version 2, the previously granted readers will now automatically have access to functionality B.

Version control can enable a slow rollout by region of a new version of a package. The version selector command can be used to designate bundle versions for consumers. For example, consumers can be defined by different regions. All regions except one (e.g., "Southeast") can be designated to use version 0.0.0 of the bundle. The "Southeast" region can be designated to use version 1.0.0.

After a package or bundle is shared, the consumer can explore the exposed contents of the bundle. For example, show commands can be used to list bundle specifications as a consumer and provider. In some embodiments, a single command can be used to show all functions and procedures of a bundle. A consumer cannot specify which version in the show command because the provider designates the version to the consumer, and the consumer cannot switch to a different version by itself.

Bundles or packages described herein can be used in different platforms. Bundles can be used with native applications. Native applications are applications built by third parties using objects from the data system, such as user defined functions (UDFs), UDTFs, external functions, stored procedures, tasks, streams, etc. These native applications can be distributed in a marketplace to other consumers. Consumers can then discover these applications on the marketplace and install them inside their accounts. The native applications may contain several discrete modules of functionality. Bundles, for example, can be included in these discrete modules.

Figure 6:
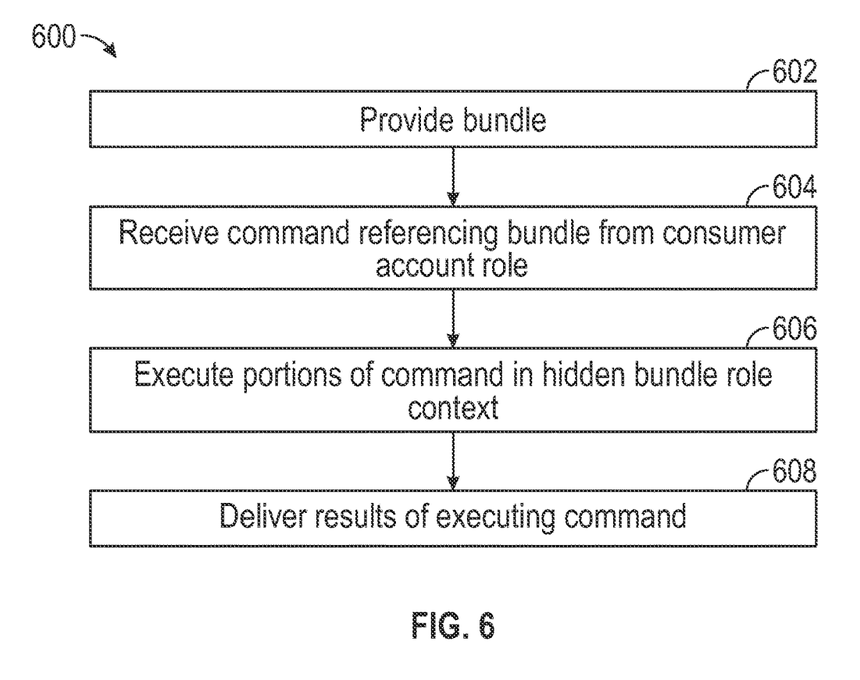
FIG. 6 illustrates a flow diagram for a method for operating a bundle, according to some example embodiments.

FIG. 6 illustrates a flow diagram for a method 600 for operating a bundle, according to some example embodiments. At operation 602, a bundle may be provided. For example, a bundle may be created and defined, as described above. Privileges to access the bundle may be granted, for example to a consumer account role. The bundle may include an interface accessible by the consumer account role, and the bundle may include hidden bundle schema, which is not directly accessible by the consumer account role. The hidden bundle schema may be behind a security barrier, preventing direct access to the consumer account role.

At operation 604, a command referencing the bundle may be received from the consumer account role. At operation 606, the system may determine that command invokes exposed functionality of the bundle which is allowed for the consumer account role based on the privileges granted to the consumer account role. To execute the command, the hidden bundle schema may need to be engaged. For example, the command may need to reference hidden procedures, functions, tables, stages, etc. included in the hidden bundle schema.

At operation 606, portions of the command that needs to engage with the hidden bundle schema can be executed in the context of a hidden bundle role (e.g., hidden bundle role 426 described above). The hidden bundle role is not viewable or directly accessible by consumer account role. The hidden bundle role is nested underneath the bundle object and effectively owns the objects inside the hidden bundle schema. The hidden bundle role is not directly accessible by the consumer account role, but it is used to execute exposed functionality of the bundle.

At operation 608, results of the command execution may be delivered to the consumer account role. The consumer account role may not be aware that the command was executed in the context of the hidden bundle role.

The bundling techniques described herein improve data processing and data sharing capabilities in network data systems. The techniques allow providers to create bundles, which can then be distributed to a plurality of consumers. The consumers can then employ the bundles and execute them for their own benefit. The bundling techniques, however, allow the provider to keep control of the bundle unlike prior technological solutions. The provider can expose select functionalities and can offer version control unlike prior conventional solutions. Thus, the bundling techniques described herein improve the computer processing capabilities of a multi-tenant data system.

Figure 7:
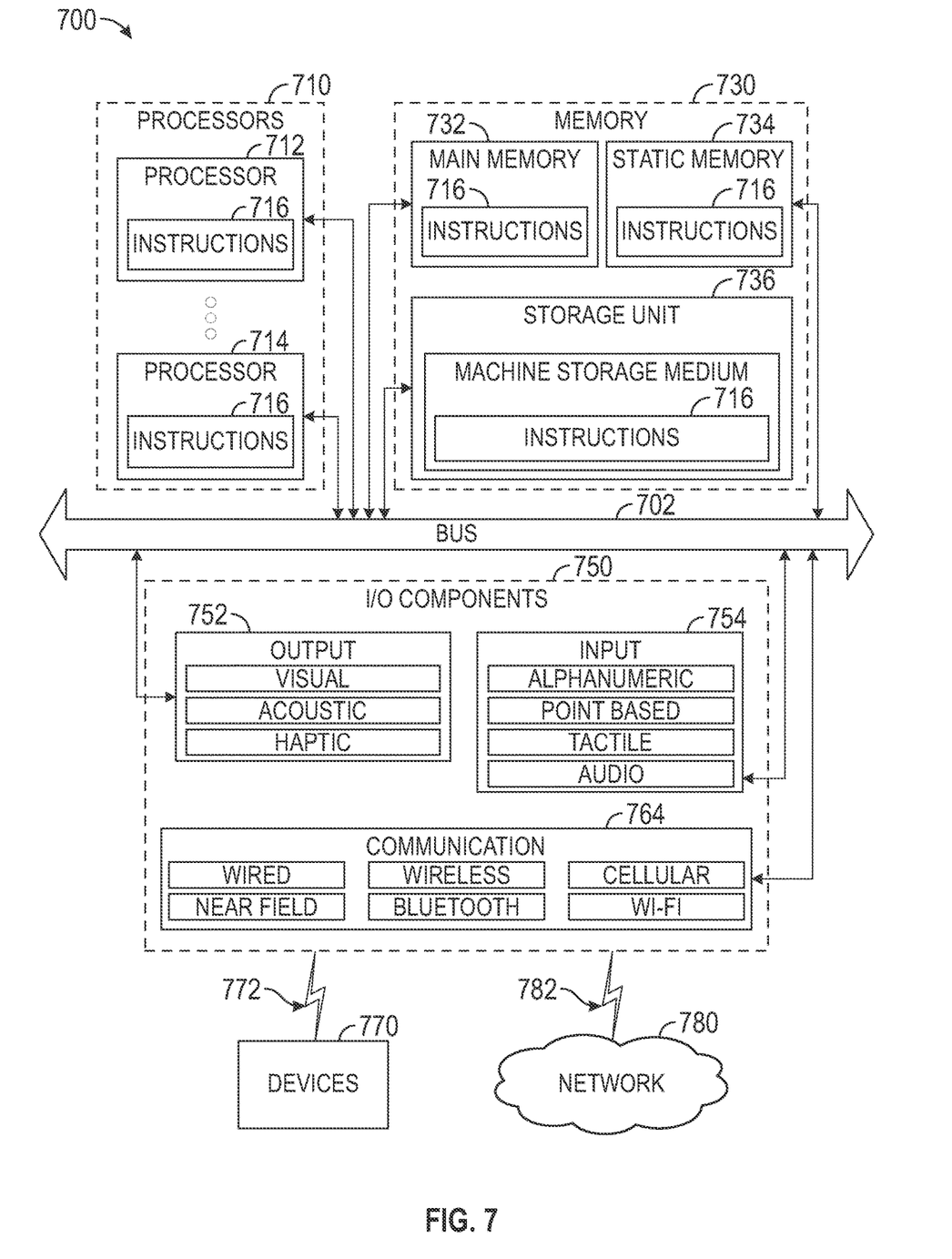
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implement portions of the data flows described herein. In this way, the instructions 716 transform a general, non-programmed machine into a particular machine 700 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities.

The devices 770 may be another machine or any of a wide variety of peripheral devices (e.g., a peripheral device coupled via a universal serial bus (USB)). For example, as noted above, the machine 700 may correspond to any one of the remote computing device 106, the access management system 118, the compute service manager 112, the execution platform 114, the Web proxy 120, and the devices 770 may include any other of these systems and devices.

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: providing, by a provider account, a bundle to a consumer account, the bundle including an interface directly accessible to the consumer account and a hidden bundle schema not directly accessible by the consumer account, the bundle schema including a code portion; receiving, from the consumer account, a command referencing the bundle; executing the code portion of the bundle in context of a hidden bundle role; and transmitting results of the command to the consumer account.

Example 2. The method of example 1, wherein the bundle resides in an account associated with the provider account in a multi-tenant database and the bundle is shared by the provider account to the consumer account.

Example 3. The method of any of examples 1-2, wherein the bundle includes a plurality of versions, and the provider account provides access to a first version of the plurality of versions to the consumer account.

Example 4. The method of any of examples 1-3, wherein the consumer account is a first consumer account, wherein the provider account provides access to a second version of the plurality of versions to a second consumer account while providing access to the first version to the first consumer account.

Example 5. The method of any of examples 1-4, further comprising: providing a security barrier between the interface and the hidden bundle schema, wherein the security barrier restricts access of the consumer account to non-exposed objects in the hidden bundle schema, and wherein the security barrier restricts objects in the hidden bundle schema from accessing objects outside the hidden bundle schema.

Example 6. The method of any of examples 1-5, wherein the code portion includes a procedure or a function.

Example 7. The method of any of examples 1-6, wherein the hidden bundle schema includes a stage or a table.

Example 8. A system comprising: one or more processors of a machine; and a memory storing instructions that, when executed by the one or more processors, cause the machine to perform operations implementing any one of example methods 1 to 7.

Example 9. A machine-readable storage device embodying instructions that, when executed by a machine, cause the machine to perform operations implementing any one of example methods 1 to 7.

What is claimed is:

1. A method comprising:
   providing, by a provider account, a bundle to a consumer account, the bundle including an interface directly accessible to the consumer account and a hidden bundle schema not directly accessible by the consumer account, the bundle schema including a code portion;
   receiving, from the consumer account, a command referencing the bundle;
   executing the code portion of the bundle in context of a hidden bundle role; and
   transmitting results of the command to the consumer account.

2. The method of claim 1, wherein the bundle resides in an account associated with the provider account in a multi-tenant database and the bundle is shared by the provider account to the consumer account.

3. The method of claim 1, wherein the bundle includes a plurality of versions, and the provider account provides access to a first version of the plurality of versions to the consumer account.

4. The method of claim 3, wherein the consumer account is a first consumer account;
   wherein the provider account provides access to a second version of the plurality of versions to a second consumer account while providing access to the first version to the first consumer account.

5. The method of claim 1, further comprising:
   providing a security barrier between the interface and the hidden bundle schema, wherein the security barrier restricts access of the consumer account to non-exposed objects in the hidden bundle schema, and wherein the security barrier restricts objects in the hidden bundle schema from accessing objects outside the hidden bundle schema.

6. The method of claim 1, wherein the code portion includes a procedure or a function.

7. The method of claim 1, wherein the hidden bundle schema includes a stage or a table.

8. A machine-storage medium embodying instructions that, when executed by a machine, cause the machine to perform operations comprising:
   providing, by a provider account, a bundle to a consumer account, the bundle including an interface directly accessible to the consumer account and a hidden bundle schema not directly accessible by the consumer account, the bundle schema including a code portion;
   receiving, from the consumer account, a command referencing the bundle;
   executing the code portion of the bundle in context of a hidden bundle role; and
   transmitting results of the command to the consumer account.

9. The machine-storage medium of claim 8, wherein the bundle resides in an account associated with the provider account in a multi-tenant database and the bundle is shared by the provider account to the consumer account.

10. The machine-storage medium of claim 8, wherein the bundle includes a plurality of versions, and the provider account provides access to a first version of the plurality of versions to the consumer account.

11. The machine-storage medium of claim 10, wherein the consumer account is a first consumer account;
    wherein the provider account provides access to a second version of the plurality of versions to a second consumer account while providing access to the first version to the first consumer account.

12. The machine-storage medium of claim 8, further comprising:
    providing a security barrier between the interface and the hidden bundle schema, wherein the security barrier restricts access of the consumer account to non-exposed objects in the hidden bundle schema, and wherein the security barrier restricts objects in the hidden bundle schema from accessing objects outside the hidden bundle schema.

13. The machine-storage medium of claim 8, wherein the code portion includes a procedure or a function.

14. The machine-storage medium of claim 8, wherein the hidden bundle schema includes a stage or a table.

15. A system comprising:
    at least one hardware processor; and
    at least one memory storing instructions that, when executed by the at least one hardware processor, cause the at least one hardware processor to perform operations comprising:
    providing, by a provider account, a bundle to a consumer account, the bundle including an interface directly accessible to the consumer account and a hidden bundle schema not directly accessible by the consumer account, the bundle schema including a code portion;
    receiving, from the consumer account, a command referencing the bundle;
    executing the code portion of the bundle in context of a hidden bundle role; and
    transmitting results of the command to the consumer account.

16. The system of claim 15, wherein the bundle resides in an account associated with the provider account in a multi-tenant database and the bundle is shared by the provider account to the consumer account.

17. The system of claim 15, wherein the bundle includes a plurality of versions, and the provider account provides access to a first version of the plurality of versions to the consumer account.

18. The system of claim 17, wherein the consumer account is a first consumer account;
    wherein the provider account provides access to a second version of the plurality of versions to a second consumer account while providing access to the first version to the first consumer account.

19. The system of claim 15, the operations further comprising:
    providing a security barrier between the interface and the hidden bundle schema, wherein the security barrier restricts access of the consumer account to non-exposed objects in the hidden bundle schema, and wherein the security barrier restricts objects in the hidden bundle schema from accessing objects outside the hidden bundle schema.

20. The system of claim 15, wherein the code portion includes a procedure or a function.

21. The system of claim 15, wherein the hidden bundle schema includes a stage or a table.

\* \* \* \* \*